(12) United States Patent
Sakai (10) Patent No.: US 7,175,087 B2
(45) Date of Patent: Feb. 13, 2007

(54) METHOD OF ANALYZING ASTIGMATIC DIFFERENCE AND METHOD OF CORRECTING THE SPOT DIAMETERS FOR AN OPTICAL DEVICE AND SPOT ANALYSIS SYSTEM

(75) Inventor: Hiroshi Sakai, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 35 days.

(21) Appl. No.: 11/013,550

(22) Filed: Dec. 15, 2004

(65) Prior Publication Data
US 2005/0156044 A1    Jul. 21, 2005

Related U.S. Application Data

(63) Continuation-in-part of application No. 10/898,439, filed on Jul. 23, 2004.

(30) Foreign Application Priority Data
Jul. 25, 2003    (JP)    ............................. 2003-280384

(51) Int. Cl.
G06K 7/10    (2006.01)
(52) U.S. Cl. ................. 235/454; 359/279; 369/112.01; 369/112.03; 369/112.23
(58) Field of Classification Search ................ 235/454; 359/279; 369/112.01, 112.03, 112.23
See application file for complete search history.

(56) References Cited

U.S. PATENT DOCUMENTS 5,783,818 A * 7/1998 Manabe et al. ............. 250/239
5,923,636 A * 7/1999 Haruguchi et al. ...... 369/112.12
6,266,314 B1 * 7/2001 Fukakusa et al. ....... 369/112.01
6,507,548 B1 * 1/2003 Kim et al. .............. 369/112.01
6,801,492 B2 * 10/2004 Lee et al. ............... 369/112.26
2003/0227861 A1 * 12/2003 Kim et al. .............. 369/112.15

* cited by examiner

Primary Examiner—Thien M. Le
Assistant Examiner—Allyson N Trail
(74) Attorney, Agent, or Firm—Reed Smith LLP (57) ABSTRACT

A method of analyzing the astigmatic difference of an optical device for analyzing the astigmatism inherent to the optical device by utilizing a condensation performance analysis system while correcting the astigmatic difference inherent to the condensation performance analysis system for analyzing the condensation performance of the optical device to be analyzed. The method of analyzing an astigmatic difference has steps comprising: obtaining the astigmatic difference $R(\theta_n)$ at an angle $\theta_n$ while rotating the data points obtained from the optical device about given basic axes; computing a vector coefficient $R_0$ in the same direction as the basic axes and another vector coefficient $R_{45}$ at 45 degree to the basic axes by utilizing the maximum angle $\theta_{max}$ at the greatest value of the astigmatic difference $R(\theta_n)$ and the greatest astigmatic difference $\theta_{max}$; computing an astigmatic difference $R(\theta)$ at an arbitrary angle $\theta$ derived from the vector coefficient $R_0$ and the vector coefficient $R_{45}$ by a fitting technique; correcting the vector coefficient $R_0$ and the vector coefficient $R_{45}$ by analyzing the condensation performance analysis system using a reference optical device with a known astigmatic difference; and computing the astigmatic difference of the optical device by utilizing the corrected vector coefficient $R_0$ and corrected vector coefficient $R_{45}$.

6 Claims, 6 Drawing Sheets

FIGURE 6 (a) Before correction

FIGURE 6 (b) After correction

METHOD OF ANALYZING ASTIGMATIC DIFFERENCE AND METHOD OF CORRECTING THE SPOT DIAMETERS FOR AN OPTICAL DEVICE AND SPOT ANALYSIS SYSTEM

CROSS-REFERENCE TO RELATED APPLICATIONS

This application is a continuation-in-part application of Ser. No. 10/898,439, filed Jul. 23, 2004 which claims priority of Japanese Application No. 2003-280384, filed Jul. 25, 2003, the complete disclosures of which are hereby incorporated by reference.

BACKGROUND OF THE INVENTION a) Technical Field

The present invention relates to a method of analyzing the astigmatic difference of an optical device such as an optical pickup device or the like. It particularly relates to a method of analyzing the astigmatic difference inherent to an optical device while correcting the astigmatic difference inherent to a condensation performance analysis system such as a spot analysis system or the like.

b) Background Technology

Recently, optical pickup devices have often been used to write data onto optical disks such as CDs and MDs and these optical disks are expected to store a large volume of data. To meet the trend of large data storage capacity, a spot size for recording the data must be minimized in order to increase the density of data recording. A reduction in wavelength plays an important role in accomplishing this. Nevertheless, a laser beam has an astigmatism characteristic that causes a person to see emitted points at different positions spread apart when viewed in the vertical and the horizontal directions or the laser beam appears substantially elliptical in cross section. As a result, it is a general practice that an optical pickup device is designed to have an optical system for correcting the astigmatic difference. The amount by which the astigmatic difference needs to be corrected is measured by analyzing the optical pickup device optically.

As described above, the condensing performance of an optical pickup device is usually determined through spot analysis. The indices of the spot analysis are each of the aberrations represented by the spot diameter, focal depth, spherical aberration, coma aberration, and astigmatism, and the spot analysis is performed by a spot analysis system. For example, known optical pickup analysis systems include the OPT-W series manufactured by Nissho Electronics Corporation, which analyzes the spot condensed by an optical pickup device used for the optical system of a microscope.

The basic configuration of the spot analysis system is the same as that of a microscope in that it uses the optical system used for a microscope. For this reason, the spot analysis system itself has aberrations such as a spherical aberration, coma aberration, and astigmatism that prevent the spot analysis system from accurately analyzing astigmatic difference.

Therefore, to analyze a spot accurately for the optical pickup device by utilizing a spot analysis system, aberrations that are present in the spot analysis system must be corrected. For such aberrations, a spherical aberration can be corrected by changing the thickness of a cover glass in the spot analysis system, and a coma aberration can be corrected by tiling the cover glass.

PROBLEMS TO BE SOLVED BY THE INVENTION

Nonetheless, in light of the aberrations inherent to the spot analysis system itself, it is difficult to correct the astigmatism mechanically or by means of a mechanism because a spot analysis system has the same basic configuration as a microscope. To correct each aberration in a conventional manner, an optical element such as an oblique glass, or the like for an astigmatism correction, must be embedded in the middle of the optical path of the spot analysis system. The optical device that is embedded therein corrects the astigmatism, but it generates a new type of astigmatism that is inherent to the optical element itself, which also requires correction. Hence, the correctional operation is complicated. To overcome this drawback, more components are required for analyzing the condensation performance of an optical pickup device. Hence, the cost of analyzing an astigmatic difference is increased.

The present invention was proposed after carefully studying these issues and the object of this invention is to provide methods for correcting the astigmatism inherent to the condensation analysis system in the absence of an optical element for correcting astigmatism, and also provides methods for correcting a spot diameter. These methods can contribute to a reduction in the number of components and the associated cost required for analyzing the astigmatic difference of an optical system. The present invention also provides a spot analysis system. Additionally, the methods of the present invention for analyzing astigmatic differences and for correcting the spot diameter for an optical device and the spot analysis system thereof do not complicate the correction operation but rather simplify it.

OBJECT AND SUMMARY OF THE INVENTION

To overcome the previously described problems, the object of the present invention is to correct astigmatism by processing data through computer software prior to analyzing the astigmatic difference of an optical device, instead of using an optical element for the astigmatism correction.

In more concrete terms, the present invention provides the following:

A method of analyzing the astigmatic difference of an optical device for analyzing the astigmatism inherent to the optical device by utilizing a condensation performance analysis system while correcting the astigmatic difference inherent to the condensation performance analysis system for analyzing the condensation performance of the optical device to be analyzed. The method of analyzing an astigmatic difference has steps comprising: obtaining the astigmatic difference $R(\theta_n)$ at an angle $\theta_n$ while rotating the data points obtained from the optical device about given basic axes; computing a vector coefficient $R_0$ in the same direction as the basic axes and another vector coefficient $R_{45}$ at 45 degree to the basic axes by utilizing the maximum angle $\theta_{max}$ at the greatest value of the astigmatic difference $R(\theta_n)$ and the greatest astigmatic difference $\theta_{max}$; computing an astigmatic difference $R(\theta)$ at an arbitrary angle $\theta$ derived from the vector coefficient $R_0$ and the vector coefficient $R_{45}$ by a fitting technique; correcting the vector coefficient $R_0$ and the vector coefficient $R_{45}$ by analyzing the condensation performance analysis system using a reference optical device with a known astigmatic difference; and computing the astigmatic difference of the optical device by utilizing the corrected vector coefficient $R_0$ and corrected vector coefficient $R_{45}$.

A method for analyzing the astigmatic difference of an optical device for analyzing the astigmatism inherent to an optical device by utilizing a condensation performance analysis system while correcting the astigmatic difference inherent to the condensation performance analysis system for analyzing the condensation performance of the optical device to be analyzed. The method of analyzing the astigmatic difference has steps comprising: obtaining the astigmatic difference R ($\theta_n$) at an angle $\theta_n$ while rotating the data received from the optical device about given basic axes; computing a vector coefficient $R_0$ in the same direction as the basic axes and another vector coefficient $R_{45}$ at 45 degree to the basic axes by utilizing the maximum angle $\theta_{max}$ at the greatest value of the astigmatic difference $R(\theta_n)$ and the greatest astigmatic difference $\theta_{max}$; computing the astigmatic difference $R(\theta)$ at an arbitrary angle $\theta$ by deriving it from the vector coefficient $R_0$ and the vector coefficient $R_{45}$ by a fitting technique; computing a correction coefficient $\alpha_0$ and correction intercepts $\beta_0$ for the vector coefficient $R_0$ while computing a correction coefficient $\alpha_{45}$ and correction intercepts $\beta_{45}$ for the vector coefficient $R_{45}$ by analyzing a reference optical device with a known astigmatic difference by utilizing the condensation performance analysis system; and correcting the vector coefficient $R_0$ by utilizing the correction coefficient $\alpha_0$ and correction intercepts $\beta_0$ and correcting the vector coefficient $R_{45}$ utilizing the correction coefficient $\alpha_{45}$ and the correction intercept $\beta_{45}$; and computing the astigmatic difference of the optical device by utilizing a corrected vector coefficient $R_0$ and a corrected vector coefficient $R_{45}$.

The steps of the present invention eliminate the need for an optical element used for an astigmatism correction to be embedded in the middle of the optical path in a condensation performance analysis system in the course of an astigmatism correction. Because the steps comprise: obtaining the astigmatic difference R ($\theta_n$) at an angle $\theta_n$ while rotating the data received from the optical device about given basic axes; computing two vector coefficients $R_0$ and $R_{45}$ required for orthogonal decomposition and computing the astigmatic difference $R(\theta)$ at an arbitrary angle $\theta$ (continuous value) utilizing the vector coefficients; computing a correction coefficient and correction intercepts for the vector coefficients by analyzing the reference optical device having a known astigmatic difference by utilizing a condensation performance analysis system such as a spot analysis system, interferometer, or the like, that use a condensation performance analysis system; and correcting the vector coefficients $R_0$ and $R_{45}$ by utilizing the correction coefficient and the correction intercepts; and computing the astigmatic difference of the optical device by utilizing the corrected vector coefficient $R_0$ and the corrected vector coefficient $R_{45}$.

Thus, the number of components is reduced, as is the cost required for correcting the astigmatism inherent to the condensation performance system itself and for analyzing the condensation performance of the optical device.

A method of correcting a spot diameter obtained by an optical pickup device based on the astigmatic difference, which is computed by the method of analyzing astigmatic difference, wherein the optical device is an optical pickup device and the condensation performance analysis system is a spot analysis system which corrects spot diameters.

A spot analysis system which corrects a spot diameter by the method for correcting spot diameters.

According to the present invention, a spot diameter can be corrected without an optical element for astigmatism correction embedded in the middle of the optical path of a spot analyzing system because it is the spot diameter obtained from the optical pickup device that is corrected based on the astigmatic difference computed by the previously described method of analyzing the astigmatic difference.

ADVANTAGEOUS EFFECTS OF THE INVENTION

The method of analyzing an astigmatic difference and correcting the spot diameter of an optical device and the spot analysis system of the present invention are, as described previously, configured so as to correct the astigmatism thereof through data processing executed by software, rather than by using an optical element for astigmatism correction. Consequently, they contribute to reducing the number of components and the cost required for analyzing astigmatic differences. Additionally, they do not complicate correction operation, but rather simplify it.

BRIEF DESCRIPTION OF THE DRAWINGS

In the drawings:

FIG. 6a is before correction; and

FIG. 6b is after correction.

DESCRIPTION OF THE PREFERRED EMBODIMENTS

The best mode for practicing the present invention is described herein with reference to the drawings.

Hardware Configuration

Figure 1:
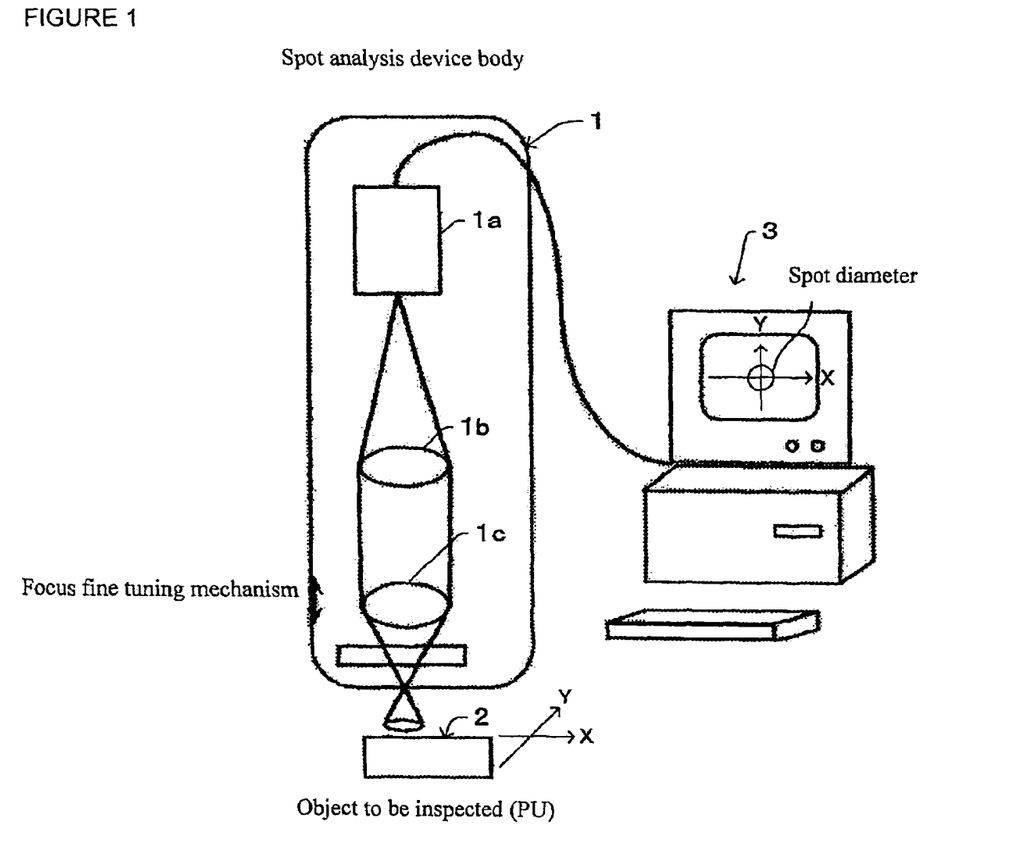
FIG. 1 is a diagram illustrating a hardware configuration that implements the method of analyzing the astigmatism associated with an embodiment of the present invention.

FIG. 1 is a diagram illustrating the hardware that is configured for executing the method of analyzing the astigmatic differences associated with the embodiment of the present invention.

In FIG. 1, the execution of the method of analyzing the astigmatic difference associated with the embodiment of the present invention involves a spot analysis system 1, an optical pickup device 2, and a computer 3 connected to spot analysis system 1 wherein these components are configured in such a manner that the basic configuration remains the same as a microscope.

Spot analyzing system 1 is constructed with: a CCD camera 1a which photoelectrically converts a laser beam transmitted by an optical element; an ocular lens 1b which condenses a laser beam onto a receiving element in CCD camera 1a; and an objective lens 1c capable of fine tuning the focal point.

Now, assume that the basic axes, which are made up of the x-axis and the y-axis orthogonally intercepting the x axis, are defined in a direction perpendicular to the optical axis of the laser beam emitted by optical pickup device 2. Also assume that the basic axes, which are the x-axis and the y-axis that orthogonally intercepts the x-axis, are defined in the display connected to computer 3 to display the spot diameter of a laser beam emitted by optical pickup device 2. These basic axes of the laser beam and the display correspond to each other: for example, if optical pickup device 2 is rotated by θ with respect to the basic axes, the spot diameter data shown on the display connected to computer 3 also rotates by θ with respect to the basic axes.

Method of Analyzing Astigmatic Difference

Figure 2:
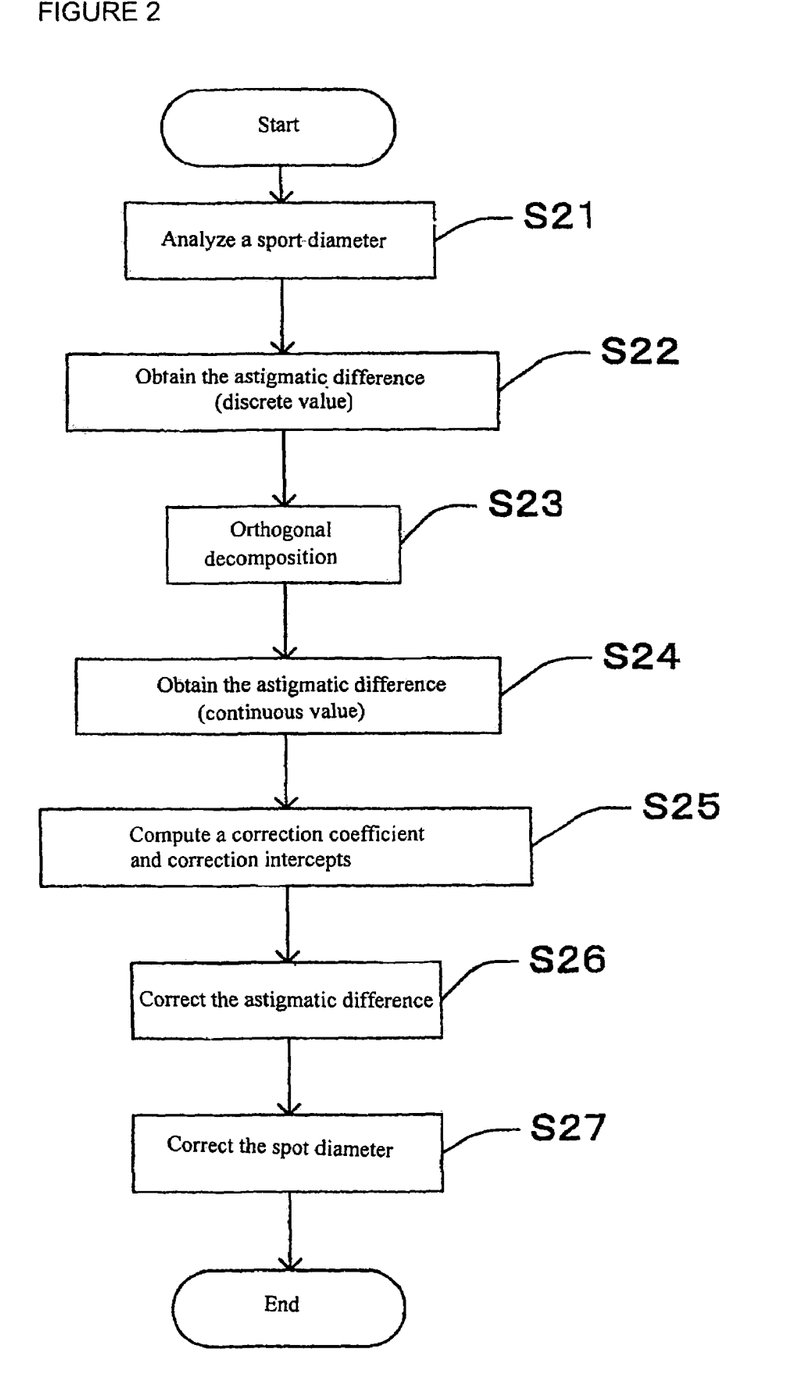
FIG. 2 is a flow chart illustrating the flow of the process steps of the method for analyzing the astigmatic difference associated with an embodiment of the present invention.

FIG. 2 is a flow chart illustrating the flow of steps followed in the method of analyzing the astigmatic difference associated with the embodiment of the present invention.

In FIG. 2, the method of analyzing astigmatic difference employed in the embodiments of the present invention begins with the step of measuring the spot diameter of a laser beam (Step S21). More specifically, a CCD camera 1a in the spot analysis system 1 measures the diameter of the spot of the laser beam emitted by optical pickup device 2 and saves this data in memory (not illustrated) in computer 3.

Figure 3:
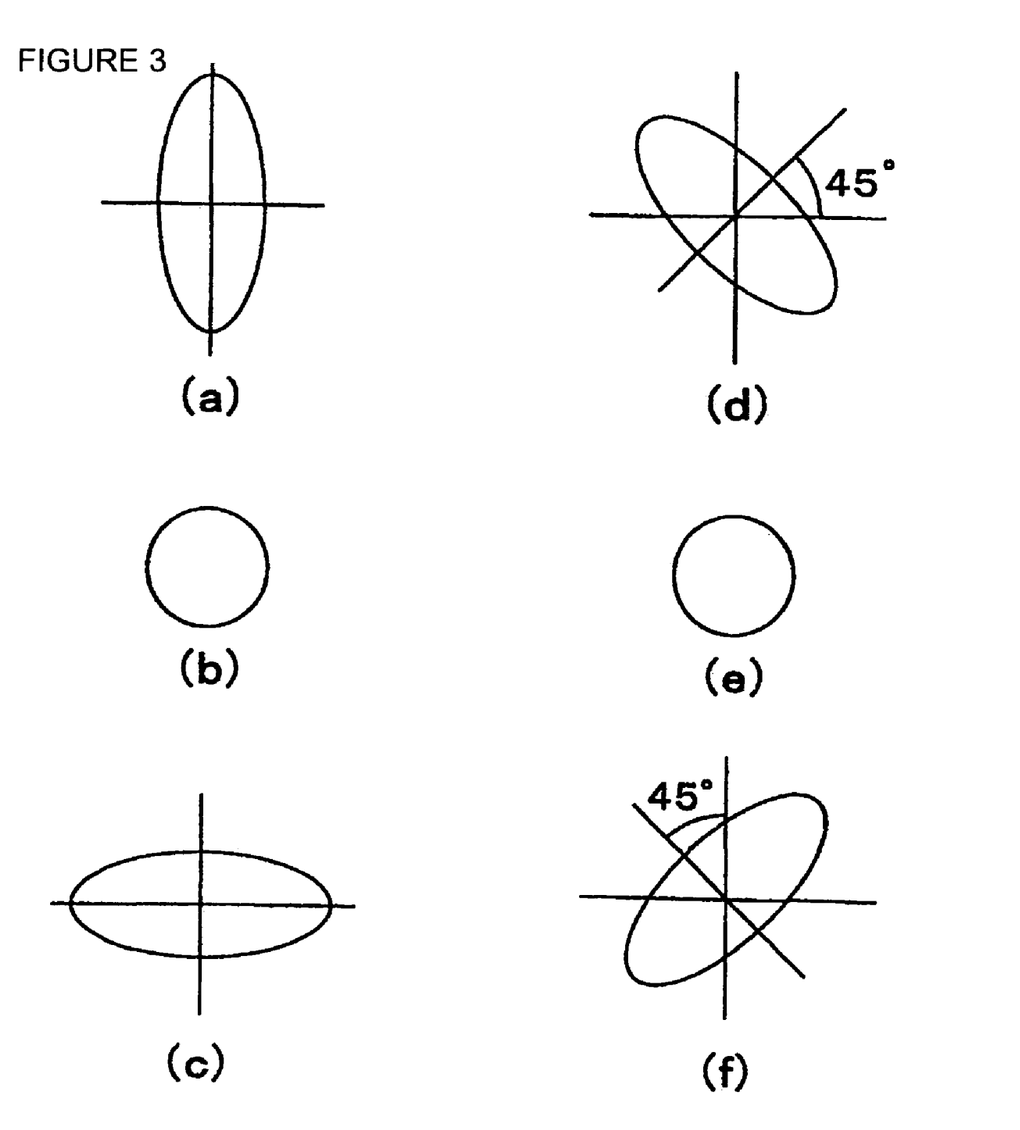
FIG. 3 is a diagram illustrating the shape of spots with an astigmatic difference in different focal states.

Now, if one observes the spot diameter of a laser beam by defocusing the intensity distribution of a spot image having astigmatism while measuring the diameter of the spot using a CCD camera 1a, the cross section of the spot diameter in the middle of the astigmatic difference appears to be a circle of least confusion, which is approximately a circle (See FIG. 3 (b)). As one moves the point of observation away from the middle of astigmatic difference, the cross section of the spot diameter appears elliptical (See FIG. 3 (a) or (c)). Depending on the properties of the optical pickup device 2, the ellipse may have a slope along the basic axes. The slope along the basic axes may be 45 degrees, for example, as illustrated in FIGS. 3 (d)14 (f).

In this way, the astigmatic difference (discrete value) is obtained (Step S22). More specifically, the focal point, at which the ellipse has the shortest (long and short) axes, is detected based on the spot diameter data, which is entered into computer 3 in Step S21, and then, the distance between the two focal points is computed. The astigmatic difference R ($\theta_n$) is thus obtained. Note that the inclination of the eclipse with respect to the basic axes is defined as $\theta_n$.

Figure 4:
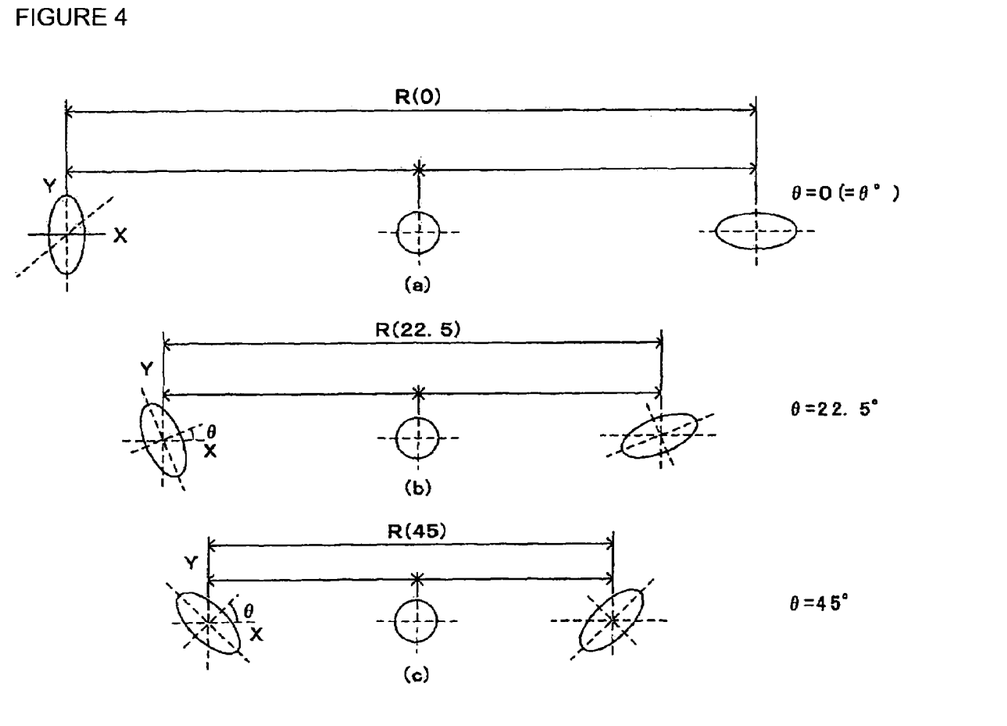
FIG. 4 is a diagram explaining the variation in the amount of focusing to the spot facing point of the basic axes for each angle $\theta$.

In Step S22, the data obtained from the optical pickup device 2 is rotated about the given basic axes to obtain the astigmatic difference. In more concrete terms, as described above, rotation of optical pickup device 2 by θ along the basic axes rotates the spot diameter data points by θ along the basic axes, and therefore, the astigmatic difference is obtained by rotating optical pickup device 2 about the basic axes. FIG. 4 shows examples of such a rotation: if a spot diameter data point is rotated by 0 degrees ($\theta_n=0$) along the basic axes, the astigmatic difference R(0) is computed (FIG. 4 (a)); if the spot diameter data point is rotated by 22.5 degrees ($\theta_n=22.5$) along the basic axes, the astigmatic difference R (22.5) is computed (FIG. 4 (b)); if a spot diameter data point is rotated by 45 degrees ($\theta_n=45$) along the basic axes, the astigmatic difference R (45) is computed (FIG. 4 (c)). Note that FIG. 4 (a)14 (c) show that a spot diameter data attains different degrees of astigmatic difference (R (0)>R (22.5)>R (45)) for different angles of rotation. This is due to the characteristics of optical pickup device 2.

Preferably, Step S22 is performed for more than three points within the range 0–45 degrees in advance to perform fitting described later in an appropriate manner.

Next, an orthogonal decomposition is performed on the astigmatic difference R ($\theta_{max}$) (Step S23), which is defined as the greatest degree in the multiple astigmatic differences R ($\theta_n$) obtained in Step S22 ($\theta_{max}$ is also defined as the slope of the ellipse on the basic axes when the astigmatic difference along the basic axes is the greatest R ($\theta_{max}$)). More specifically, the astigmatic difference 0 (vector coefficient $R_0$) at the same direction as the basic axes and the astigmatic difference 45 (vector coefficient R45) at 45 degree along the basic axes are computed by plugging the maximum astigmatic difference amount R($\theta_{max}$) and the maximum astigmatic angle $\theta_{max}$ into the following formula.

Mathematical Formula 1

$$\text{Astigmatic difference } 0 = R\ (\theta_{max}) \times \cos 2\theta\text{max} \quad \text{Formula (1)}$$

$$\text{Astigmatic difference } 45 = R\ (\theta_{max}) \times \sin 2\theta\text{max} \quad \text{Formula (2)}$$

Then, the astigmatic difference (continuous value) is computed (Step S24). In other words, the astigmatic difference R (θ) at an arbitrary angle θ is computed using the astigmatic difference 0 and the astigmatic difference 45 obtained by Formulae (1) and (2). More specifically, the astigmatic difference at an arbitrary angle θ (continuous value) is computed by a fitting technique such as the least squares method or the like.

Mathematical Formula 2

$$R(\theta) = \sqrt{(\text{astigmatic difference } 0 \times \cos 2\theta)_2 + (\text{astigmatic difference } 45 \times \sin 2\theta)_2} \quad \text{Formula 3}$$

Techniques used for fitting include the least squares method, although the present invention is not limited to this technique. Any fitting technique, for example, polynomials, the Chebyshev method, or the like, may be selected.

Next, a correction coefficient and correction intercepts are computed (Step S25). More specifically, the correction coefficient $\alpha_0$ at the astigmatic difference 0 and the intercepts $\beta_0$ thereof and the correction coefficient $\alpha_{45}$ at the astigmatic difference 45 and the intercepts $\beta_{45}$ thereof are computed by analyzing the reference optical pickup device that has a known astigmatic difference using a spot analysis system. It is noteworthy that a spot analysis system was selected for the condensation performance analysis system in this embodiment. However, another analysis system such as an interferometer or the like may be employed. In this case, the correction coefficients and the correction intercepts computed in Step S25 would serve as parameters for the spot analysis system and the interferometer.

Then, the astigmatic difference 0 and the astigmatic difference 45 are corrected using the correction coefficient and the correction intercepts computed in Step S25 (Step S26). More specifically, the astigmatic difference which the spot analysis system itself has is cancelled by plugging the astigmatic difference 0 and the astigmatic difference 45 of the object to be analyzed into the following formulae.

Mathematical Formula 3

$$\text{Corrected astigmatic difference } 0 = \alpha_0 \times \text{astigmatic difference } 0 \text{ of the object to be analyzed} + \beta_0 \quad \text{Formula (4)}$$

$$\text{Corrected astigmatic difference } 0 = \alpha_{45} \times \text{astigmatic difference } 0 \text{ of the object to be analyzed} + \beta_{45} \quad \text{Formula (5)}$$

Figure 5:
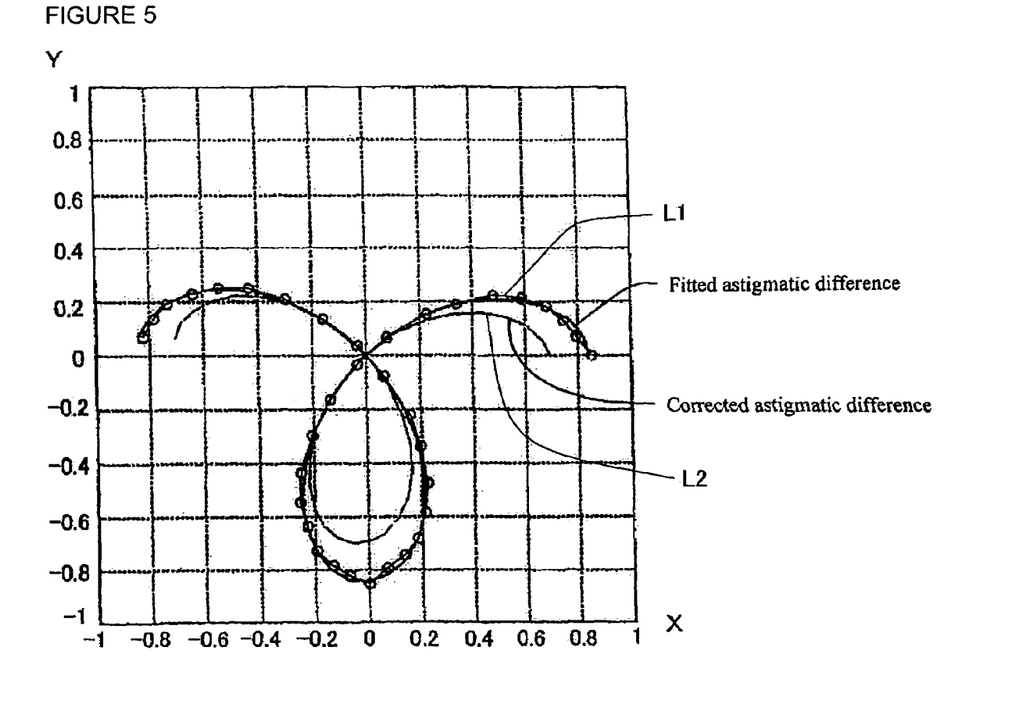
FIG. 5 is a diagram illustrating an astigmatic difference before applying the fitting technique and the astigmatism after correction.

FIG. 5 illustrates the astigmatic difference corrected in Step S25. The data points are plotted in such a manner that the vertical axis represents the result of an astigmatic difference R (θ)×cosθ while the horizontal axis represents the result of an astigmatic difference R (θ)×sinθ. Also, the data points plotted with small circles represent discrete values before the correction; the line L1 represents astigmatic differences (continuous values) computed or fitted in Step S24. The line L2 represents the astigmatic differences corrected in Step S26. As is apparent from FIG. 5, the amount of astigmatic difference (the distance between the origin and an arbitrary point on the line L1 or the line L2) is small as a whole.

Figure 6:
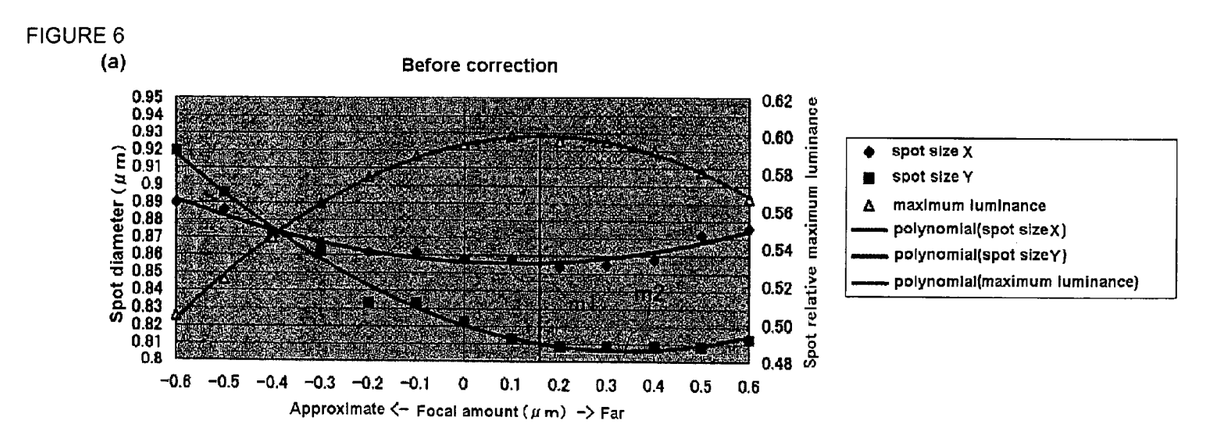
FIG. 6 is a diagram illustrating an example of correcting a spot diameter along the x-axis and y-axis.

Finally, the spot diameter thereof is computed based on the corrected astigmatic difference to give a numerical value that is close to the true value, thereby calibrating the deviation of the spot diameter caused by the system-to-system variance or by the astigmatic difference (Step S27). FIG. 6 shows a methodical example of the spot diameter correction in Step 27.

In FIG. 6 (a), the y-axis represents spot diameters (μm); the other end of the y-axis represents the maximum luminescence in a relative sense; and the x-axis represents focal amount (μm). The legends found in the figure represent the following parameters: the black rhombus represents the data point on the spot diameter along the x-axis; the black square represents the data points on the spot size along the x-axis (hereinafter referred to as the "spot size-x"); the white triangle in the figure represent the maximum luminance among intensity of light at each focal amount. The parameters are represented by the approximation curves.

In FIG. 6 (a), the spot size-x before correction is 0.8560 μm at a focus amount of 0.1644 μm with the maximum luminance; the spot size-y before correction is 0.8100 μm at a focus amount of 0.1644 μm. Here, the spot size is analyzed at the maximum luminance because these data are actually recorded or reproduced at the focal amount which produces the maximum luminance.

The astigmatic difference that exists before correction is the distance between m1 and m2 along the x-axis where m1 is at the minimum value on the approximation curve plotting the spot size-x and m2 is at the minimum value on the approximation curve plotting the spot size-y. In this example, the astigmatic difference is 0.239 μm.

On the other hand, the approximation curves representing the spot size-x and -y are shifted along the x-axis based on the corrected astigmatic differences. More specifically, the approximation curve representing the spot size-x and -y are shifted along the x-axis to give a corrected astigmatic difference. In this example, in which the corrected astigmatic difference is 0.089 μm, the approximation curve representing the spot size-x is shifted by 0.075 μm to the right in the drawing while the approximation curve representing the spot size-y is shifted along the y-axis by 0.075 μm to the left such that the distance between m1 and m2, the minimum values, becomes 0.089 μm.

FIG. 6 (b) shows the approximation curves that are shifted (to reflect the correction performed) in the previously described manner. The post-correction spot diameter which produces the maximum luminance at a focal amount of 0.1644 μm along the x-axis is 0.8557 μm. The spot diameter measured along the y-axis after the correction at a focal amount of 0.1644 μm is 0.8075 μm.

As such it is apparent from FIGS. 6 (a) and (b) that the spot size-x is corrected from 0.8560 μm to 0.8557 μm and the spot size-y is corrected from 0.8100 μm to 0.8075 μm.

According to this method of analyzing astigmatic difference and method of correcting a spot diameter, an astigmatism can be corrected easily without using an optical element for astigmatism correction.

OTHER EMBODIMENTS

The method of analyzing astigmatism described in the above embodiment is an example of preferable modes of the present invention, although the present invention is not limited to this embodiment. Any modification can be made as long as the essential character of the invention remains the same. For example, a laser diode may be employed as the optical device to be analyzed, and a near field analysis device may be employed as the condensation performance analysis system such that the astigmatism inherent to the near field analysis device may be corrected without using an optical element for the astigmatism correction. In short, the method of analyzing the astigmatic difference of the present invention is not limited to the spot analysis device for the optical pickup device. It may be applied to the condensation performance analysis device for analyzing the condensation performance of other optical devices.

POSSIBLE INDUSTRIAL APPLICATIONS

The method of analyzing an astigmatic difference and the method of correcting a spot diameter, and the spot analysis system of the present invention are useful in that they contribute to a reduction in the number of components and in the cost required to analyze the astigmatic difference of an optical device.

While the foregoing description and drawings represent the present invention, it will be obvious to those skilled in the art that various changes may be made therein without departing from the true spirit and scope of the present invention.

DESCRIPTION OF REFERENCE SYMBOLS 1 spot analysis device
2 optical pickup device
3 computer

What is claimed is:

1. A method of analyzing an astigmatic difference of an optical device for analyzing an astigmatism inherent to said optical device by utilizing a condensation performance analysis system while correcting the astigmatic difference inherent to said condensation performance analysis system for analyzing the condensation performance of said optical device to be analyzed;

said method of analyzing astigmatic difference has steps comprising:

obtaining the astigmatic difference R ($\theta_n$) at an angle $\theta_n$ while rotating data points obtained from said optical device about given basic axes;

computing a vector coefficient ($R_0$) in a same direction as said basic axes and another vector coefficient ($R_{45}$) at 45 degrees to said basic axes utilizing a maximum angle $\theta_{max}$ at the greatest value of said astigmatic difference $R(\theta_n)$ and the greatest astigmatic difference ($\theta_{max}$);

computing an astigmatic difference $R(\theta)$ at an arbitrary angle θ derived from said vector coefficient Rθ and said vector coefficient $R_{45}$ by a fitting technique;

correcting said vector coefficient $R_0$ and said vector coefficient $R_{45}$ by analyzing said condensation performance analysis system using a reference optical device that has a known astigmatic difference; and computing the astigmatic difference of said optical device by utilizing a corrected vector coefficient $R_0$ and a corrected vector coefficient $R_{45}$.

2. The method of correcting a spot diameter obtained by said optical pickup device based on the astigmatic difference, which is computed by said method of analyzing the astigmatic difference as set forth in claim 1, wherein said optical device is an optical pickup device and said condensation performance analysis system is a spot analysis system which corrects a spot diameter.

3. A spot analysis system which corrects a spot diameter by said method for correcting a spot diameter as set forth in claim 2.

4. A method for analyzing an astigmatic difference of an optical device for analyzing an astigmatism inherent to said optical device by utilizing a condensation performance analysis system while correcting the astigmatic difference inherent to said condensation performance analysis system for analyzing the condensation performance of said optical device to be analyzed;

said method of analyzing said astigmatic difference has steps comprising:

obtaining said astigmatic difference R ($\theta_n$) at an angle $\theta$ while rotating data received from said optical device about given basic axes;

computing a vector coefficient ($R_0$) in a same direction as said basic axes and another vector coefficient ($R_{45}$) at 45 degrees to said basic axes utilizing a maximum angle $\theta_{max}$ at the greatest value of said astigmatic difference $R(\theta_n)$ and the greatest astigmatic difference ($\theta_{max}$);

computing an astigmatic difference $R(\theta)$ at an arbitrary angle $\theta$ by derivation from said vector coefficient $R_0$ and said vector coefficient $R_{45}$ by using a fitting technique;

computing a correction coefficient $\alpha_0$ and correction intercepts $\beta_0$ for said vector coefficient $R_0$ while computing a correction coefficient $\alpha_{45}$ and correction intercepts $\beta_{45}$ for said vector coefficient $R_{45}$ by analyzing a reference optical device that has a known astigmatic difference with said condensation performance analysis system;

correcting said vector coefficient $R_0$ utilizing said correction coefficient $\alpha_0$ and correction intercepts $\beta_0$ and correcting said vector coefficient $R_{45}$ utilizing said correction coefficient $\alpha_{45}$ and said correction intercept $\beta_{45}$; and computing the astigmatic difference of said optical device utilizing a corrected vector coefficient $R_0$ and a corrected vector coefficient $R_{45}$.

5. The method of correcting a spot diameter obtained by said optical pickup device based on the astigmatic difference, which is computed by said method of analyzing the astigmatic difference as set forth in claim 4, wherein said optical device is an optical pickup device and said condensation performance analysis system is a spot analysis system which corrects a spot diameter.

6. A spot analysis system which corrects a spot diameter by said method for correcting a spot diameter as set forth in claim 5.

* * * * *